(12) United States Patent
Lee (10) Patent No.: US 10,994,444 B2
(45) Date of Patent: May 4, 2021

(54) POWER SAW BLADE COOLING ARRANGEMENT

(71) Applicant: Chao-Ying Lee, Riverside, CA (US)

(72) Inventor: Chao-Ying Lee, Riverside, CA (US)

( * ) Notice: Subject to any disclaimer, the term of this patent is extended or adjusted under 35 U.S.C. 154(b) by 0 days.

(21) Appl. No.: 14/828,488

(22) Filed: Aug. 17, 2015

(65) Prior Publication Data

US 2017/0050338 A1 Feb. 23, 2017

(51) Int. Cl.
*B28D 7/02* (2006.01)
*B23D 59/02* (2006.01)
*B28D 1/04* (2006.01)

(52) U.S. Cl.
CPC .............. *B28D 7/02* (2013.01); *B23D 59/02* (2013.01); *B28D 1/04* (2013.01)

(58) Field of Classification Search
CPC ................................. B28D 7/02; B23D 59/02
USPC ............................................................ 83/171
See application file for complete search history.

(56) References Cited

U.S. PATENT DOCUMENTS

| | | | | |
|---|---|---|---|---|
| 1,908,727 A * | 5/1933 | Bleam | ................. | B23D 55/082 83/168 |
| 2,235,582 A * | 3/1941 | Klema | ............... | B23Q 11/1084 409/136 |
| 2,972,344 A * | 2/1961 | Bergen | .................. | B23D 59/02 125/13.03 |
| 3,256,647 A * | 6/1966 | Hutton | .................. | B24B 53/007 451/450 |
| 3,577,808 A * | 5/1971 | Visser | ..................... | B23P 25/00 261/78.2 |
| 3,747,276 A * | 7/1973 | Bridwell | ................ | B23D 63/08 125/13.01 |
| 4,484,417 A * | 11/1984 | Klingerman | ........... | B23D 59/02 125/13.01 |
| 4,676,557 A * | 6/1987 | Shope | .................... | B23D 59/02 125/28 |
| 4,844,047 A * | 7/1989 | Brehm | ................. | B23D 59/002 125/13.01 |
| 5,038,474 A * | 8/1991 | Larsson | .................... | B27B 5/14 125/11.22 |
| 5,461,008 A * | 10/1995 | Sutherland | .............. | B08B 17/00 438/460 |
| 5,678,466 A * | 10/1997 | Wahl | ...................... | B23D 59/02 408/61 |
| 6,000,387 A * | 12/1999 | Lee | ...................... | B23D 47/025 125/11.22 |
| 6,206,762 B1 * | 3/2001 | Bentley | ................ | B23D 45/124 451/49 |

(Continued)

*Primary Examiner* — Ghassem Alie (74) *Attorney, Agent, or Firm* — Raymond Y. Chan; David and Raymond (57) ABSTRACT

A cutting machine includes a motor assembly, a cutting blade powered by the motor assembly for cutting a work piece, and a cooling arrangement which includes a fluid nozzle unit for delivering cooling fluid onto a cutting edge portion of the cutting blade to ensure the cooling fluid to adhere on the cutting blade by means of adhesion and cohesion of the cooling fluid so as to cool the cutting blade during the cutting operation and to combine the cooling fluid with residual particles of the work piece after the work piece is cut. Therefore, no excessive cooling fluid is stayed on the cutting blade to minimize the formation of dust, and misting of the cooling fluid during the cutting operation.

11 Claims, 5 Drawing Sheets

(56) References Cited

U.S. PATENT DOCUMENTS

| | | | | |
|---|---|---|---|---|
| 6,796,890 B1* | 9/2004 | Goldrick | ............... | B23D 59/006 |
| | | | | 125/12 |
| 7,073,495 B1* | 7/2006 | Markley | ................... | B28D 7/02 |
| | | | | 125/13.01 |
| 7,520,799 B2* | 4/2009 | Wedel | ..................... | B23D 59/02 |
| | | | | 125/13.01 |
| 7,823,491 B2* | 11/2010 | Chaffin | ............... | A22C 17/0006 |
| | | | | 83/168 |
| 7,987,752 B2* | 8/2011 | Tsung | ..................... | B23D 59/02 |
| | | | | 125/15 |
| 8,007,348 B2* | 8/2011 | Baratta | ................ | B23D 59/025 |
| | | | | 451/523 |
| 8,100,740 B2* | 1/2012 | Schlough | ............... | B28D 1/046 |
| | | | | 451/5 |
| 9,168,674 B2* | 10/2015 | Walker | .................... | B23D 59/02 |
| 9,434,011 B2* | 9/2016 | Morrison | ................... | B23C 5/20 |
| 9,630,343 B2* | 4/2017 | Vikholm | ................. | B28D 1/042 |
| 9,656,336 B2* | 5/2017 | Petersson | ................ | B25F 5/006 |
| 2002/0017817 A1* | 2/2002 | Nakayama | ............. | B23D 59/02 |
| | | | | 299/39.3 |
| 2004/0042908 A1* | 3/2004 | Donnerdal | ........... | B23D 59/006 |
| | | | | 417/229 |
| 2005/0081690 A1* | 4/2005 | Biro | ....................... | A22B 5/208 |
| | | | | 83/168 |
| 2017/0216941 A1* | 8/2017 | Petersson | ................ | B23B 45/02 |

* cited by examiner

POWER SAW BLADE COOLING ARRANGEMENT

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a cutting machine, and more particularly to a cutting machine with a power saw blade cooling arrangement, which is arranged for directly cooling the cutting blade of the cutting machine and for effectively collecting the residual particles during the cutting process so as to reduce the pollution of spitting out of the residual particles. The cooling fluid further acts as a lubricant which does cool the cutting blade by allowing the cutting blade to encounter less friction as it cuts away the work piece.

Description of Related Arts

Conventional cutting machines are widely used in various industries for provision of rapid and high quality cutting of such construction and manufacturing materials as granite, marble, slate, pave, brick, ceramics, and masonry. A conventional cutting machine generally comprises a cutting platform for supporting a work piece thereon, and a cutter head which is suspended and supported above the cutting platform, wherein the cutter head comprises a cutting saw driven by a motor to cut the work piece laid on the cutting platform. In particular, the cutting saw is rotated at a spin direction to define a front cutting point at the circumferential edge of the cutting saw, wherein the front cutting point of the cutting saw contacts with the work piece to cut through the work piece.

Figure 1:
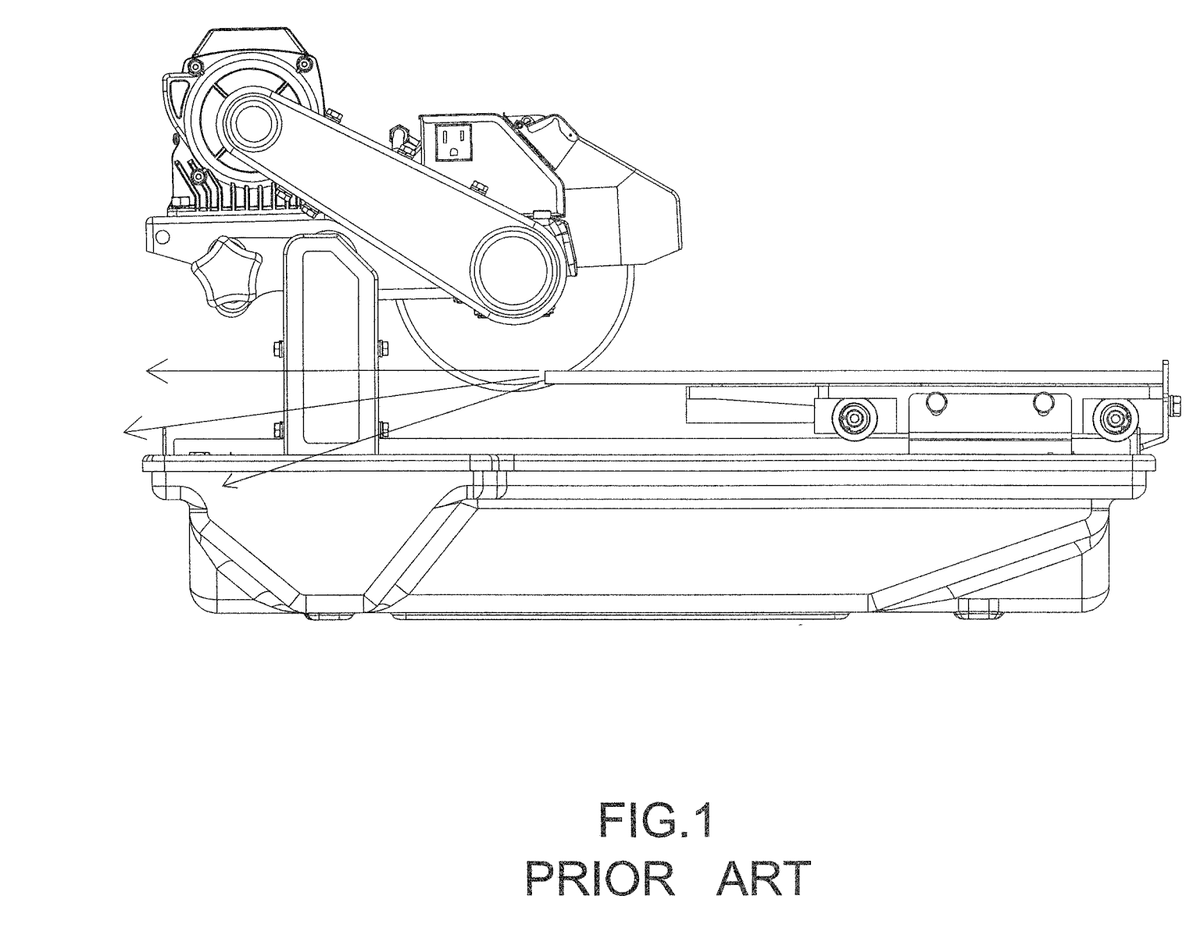
FIG. 1 is a side view of a conventional cutting machine.
Figure 2:
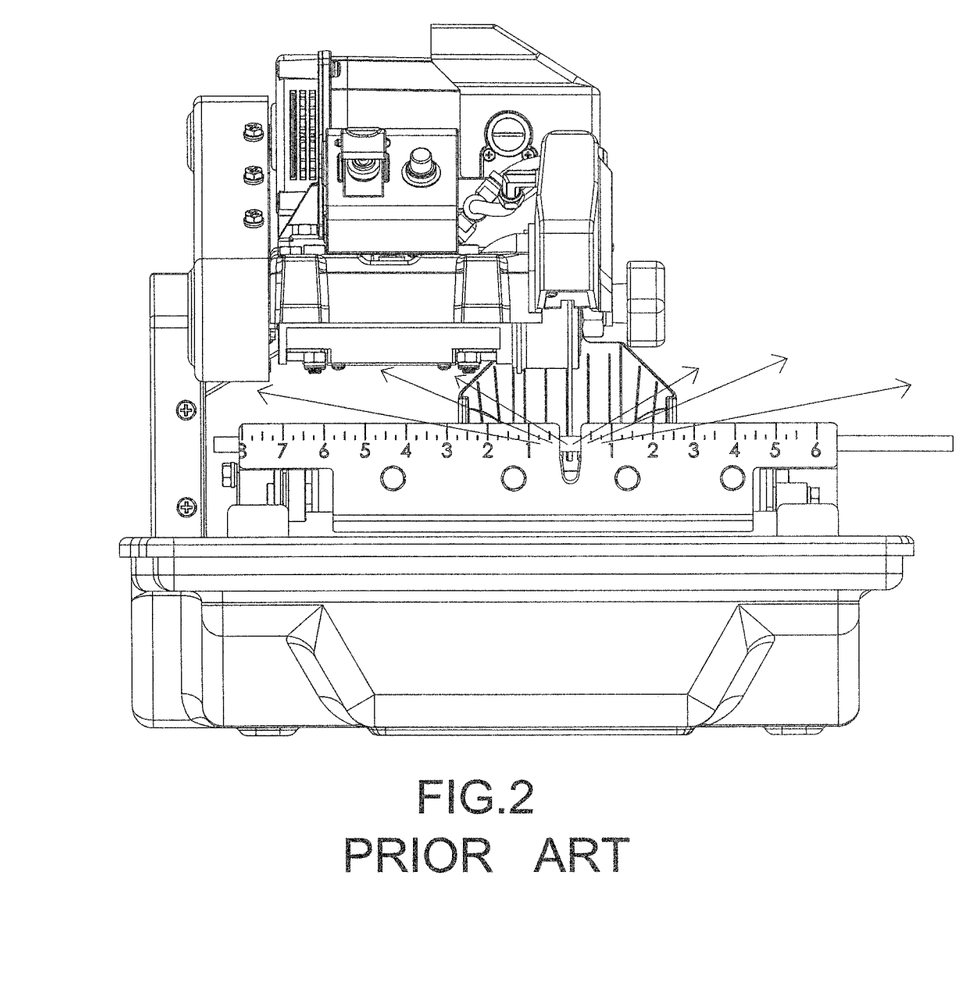
FIG. 2 is a front view of the conventional cutting machine, illustrating liquid coolant being sprayed sidewardly from the cutting machine.

Especially the tile and masonry saws, the motor must provide a higher power to drive the cutting saw to rotate. As the friction between the cutting saw and the work piece generates heat, the cutting machine further comprises a cooling machine to cool down the cutting saw during the cutting operation to prevent the damage of the cutting saw by the heat. Therefore, the cutting machine further comprises a cooling mechanism for cooling the cutting saw during the cutting operation. As shown in FIGS. 1 and 2, the cooling mechanism is arranged to deliver liquid coolant, such as water, directly onto the cutting saw in the direction of the blade rotation before it is contacted with the work piece, such that the liquid coolant will be encouraged to stay on the cutting saw causing over saturation. In other words, the cutting saw will carry more than enough liquid coolant onto the work piece during the cutting operation. As soon as the cutting saw contacts with the work piece being cut spraying and misting happens. The severity is dependent on how much liquid coolant remains on or around the cutting saw. Therefore, the prior art methodology for saw cooling is to deliver as much liquid coolant on the cutting saw and the work piece, which creates puddles of liquid coolant on the job site. It is a waste that most of the liquid coolant cannot be remains on or around the cutting saw because of the centrifugal force of the cutting saw during the cutting operation.

It is worth mentioning that residual particles are formed while the cutting saw is rotatably cutting on the work piece, wherein the rotational force of the cutting saw will spit the residual particles everywhere. As a result, the rotational force of the cutting saw will spit the residual particles and the liquid coolant rearwardly from the cutting saw as shown in FIG. 1, and sidewardly from the cutting saw as shown in FIG. 2. Accordingly, the residual particles will not only be spit on the entire frame but also be spit out of the cutting platform. Therefore, a rear guard is installed at the rear side of the frame to collect the residual particles and the liquid coolant splashed from the cutting blade at the rearward direction. However, it is impossible to collect residual particles and the liquid coolant splashed from the cutting blade at the sideward direction. More importantly, the residual particles will also be sucked into the motor with air through the ventilating holes during operation. Therefore, the motor may be burned or permanent damage while the residual particles gradually accumulate to the motor.

SUMMARY OF THE PRESENT INVENTION

The invention is advantageous in that it provides a cutting machine with a power saw blade cooling arrangement, which is arranged for directly cooling the cutting blade of the cutting machine and for effectively collecting the residual particles during the cutting process so as to reduce the pollution of spitting out of the residual particles.

Another advantage of the invention is to a cutting machine, wherein no excessive cooling fluid is stayed on the cutting blade to minimize the formation of dust, and misting of the cooling fluid during the cutting operation.

Another advantage of the invention is to a cutting machine, wherein the cooling fluid is stayed on the cutting blade by means of adhesion and cohesion of the cooling fluid to minimize moisture built up within the blade casing and to reduce the amount of cooling fluid being used for cooling the cutting blade.

Another advantage of the invention is to a cutting machine, wherein the cooling fluid further acts as a lubricant which does cool the cutting blade by allowing the cutting blade to encounter less friction as it cuts away the work piece.

Another advantage of the invention is to a cutting machine, wherein the injecting angle of the fluid nozzle unit is set at a rearward direction with respect to the cutting machine for preventing the cooling fluid stayed on the cutting blade in an over-saturated manner. In particular, the injecting angle is aligned with a radial direction of the cutting blade.

Another advantage of the invention is to a cutting machine, wherein the cooling fluid with the residual particles of the work piece is deflected to be diverted by the splash guard to control the liquid's area of affect so as to prevent puddles of cooling fluid created on the job site.

Another advantage of the invention is to a cutting machine, wherein the power saw blade cooling arrangement can be incorporated with any existing cutting machine having the rotatable cutting blade.

Another advantage of the invention is to a cutting machine, which does not require to alter the original structural design of the cutting machine, so as to minimize the manufacturing cost of the cutting machine incorporating with the power saw blade cooling arrangement.

Another advantage of the invention is to a cutting machine, wherein no expensive or complicated structure is required to employ in the present invention in order to achieve the above mentioned objects. Therefore, the present invention successfully provides an economic and efficient solution for providing an environment friendly configuration for the cutting machine.

Additional advantages and features of the invention will become apparent from the description which follows, and may be realized by means of the instrumentalities and combinations particular point out in the appended claims.

According to the present invention, the foregoing and other objects and advantages are attained by a cutting machine, which comprises a motor assembly, a cutting head arrangement, and a power saw blade cooling arrangement.

The cutting head arrangement comprises a cutting blade powered by the motor assembly, wherein the cutting blade is driven to rotate at a forward spinning direction to define a cutting edge portion for contacting with the work piece at a cutting point during a cutting operation.

The cooling arrangement comprises a fluid nozzle unit supported at the cutting head arrangement for delivering cooling fluid onto the cutting edge portion of the cutting blade to ensure the cooling fluid to adhere on said cutting blade by means of adhesion and cohesion of the cooling fluid so as to cool the cutting blade during the cutting operation and to combine the cooling fluid with residual particles of the work piece after the work piece is cut.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 3:
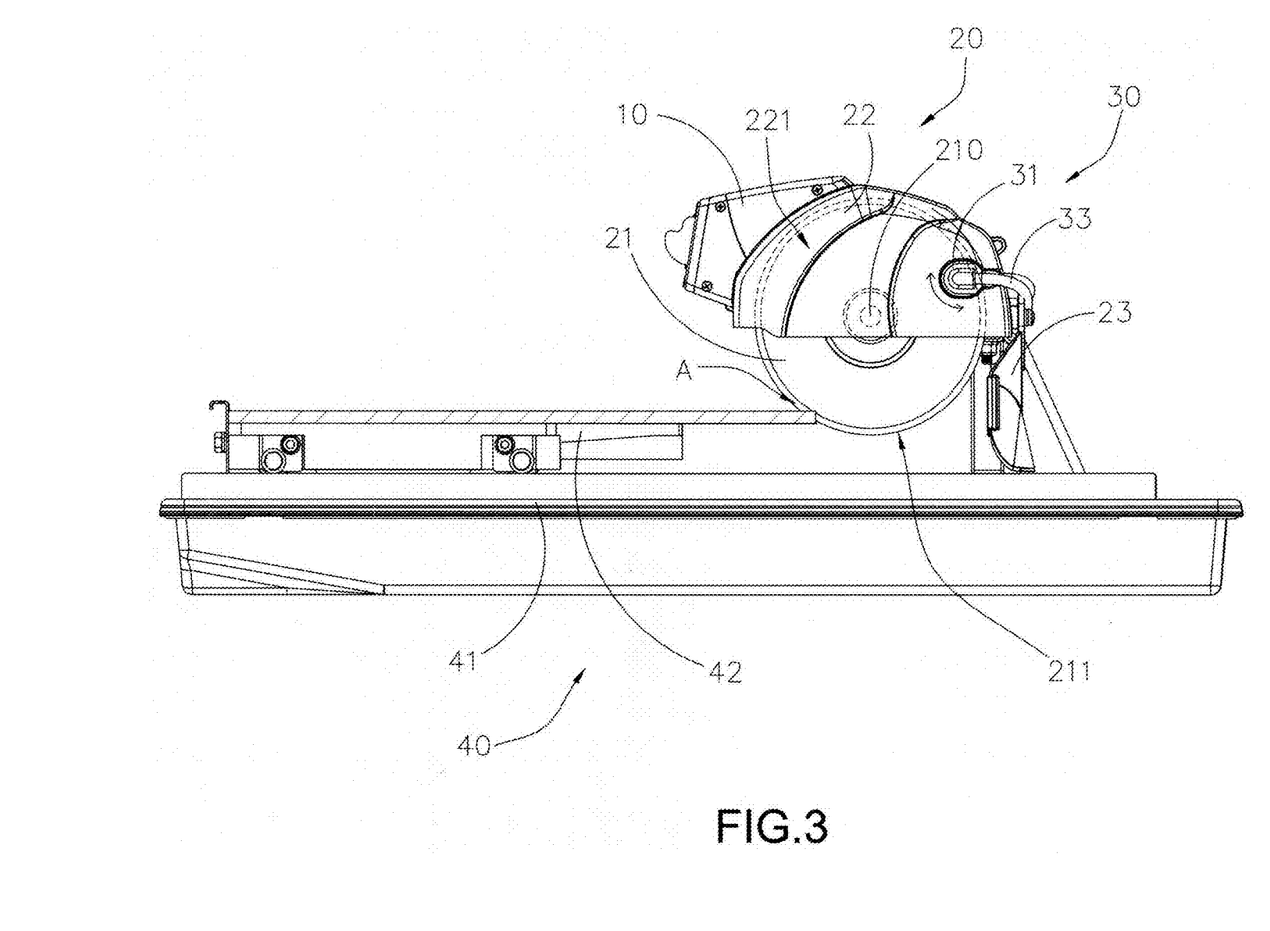
FIG. 3 is a side view of a cutting machine according to a preferred embodiment of the present invention.
Figure 4:
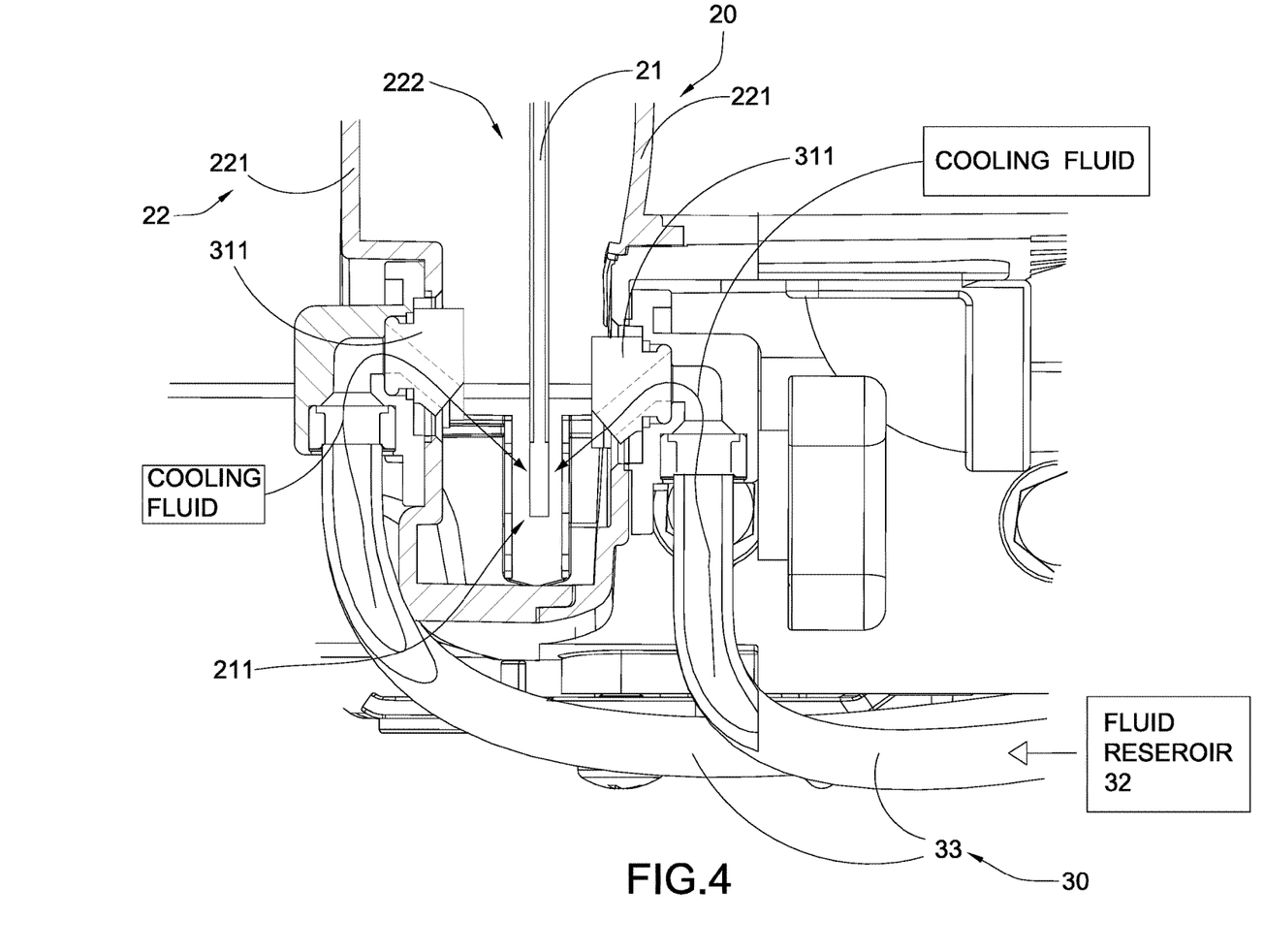
FIG. 4 is a top sectional view of the cooling arrangement of the cutting machine according to the above preferred embodiment of the present invention.

Referring to FIGS. 3 and 4 of the drawings, a cutting machine for cutting a work piece according to a preferred embodiment of the present invention is illustrated, wherein the cutting machine comprises a motor assembly 10, a cutting head arrangement 20, and a power saw blade cooling arrangement 30.

Accordingly, the cutting machine can be a hand-held machine, wherein a carrying handle is provided, such that a user is able to carry the cutting machine via the carrying handle to cut the work piece. According to the preferred embodiment, the cutting machine is embodied as a work station, wherein the cutting machine comprises a supporting frame 40 for supporting the motor assembly 10, the cutting head arrangement 20, and the cooling arrangement 30.

In particular, the supporting frame 40 comprises a base frame 41, a cutting table 42 slidably supported on the base frame 41 for supporting the work piece on the cutting table 42, wherein the cutting head arrangement 20 is overhung above the cutting table 42 for cutting the work piece thereon.

The cutting head arrangement 20 comprises a cutting blade 21 powered by the motor assembly 10, wherein the cutting blade 21 is rotated via a blade shaft 210 at a center of the cutting blade 21. The cutting blade 21 is driven to rotate at a forward spinning direction to define a cutting edge portion 211 for contacting with the work piece at a cutting point A during a cutting operation. It is worth mentioning that the cutting point A is not any point on the cutting blade 21 but is the contacting point where the rotating cutting blade 21 to cut the work piece. The cutting point A of the cutting blade 21 is located below the blade shaft 210.

The cutting head arrangement 20 further comprises a blade casing 22 which comprises two casing walls 221 and a blade cavity 222 formed between the casing walls 221. Accordingly, the blade casing 22 has a semi-circular shape and forms an elongated bottom opening to communicate with the blade cavity 222, wherein an upper portion of the cutting blade 21 is rotatably received in the blade cavity 222 while a bottom portion of the cutting blade 21 is exposed out of the blade cavity 222 through the bottom opening. It is worth mentioning that the upper portion and the lower portion of the cutting blade 21 is not defined as the portions of the cutting blade 21 when it is stationary but is defined as the portions of the cutting blade 21 during it is rotating. In other words, the upper portion of the cutting blade 21 is defined as a portion of the cutting blade 21 above the blade shaft 210 during the rotation of the cutting blade 21 and the lower portion of the cutting blade 21 is defined as a portion below the blade shaft 210 during the rotation of the cutting blade 21.

Figure 5:
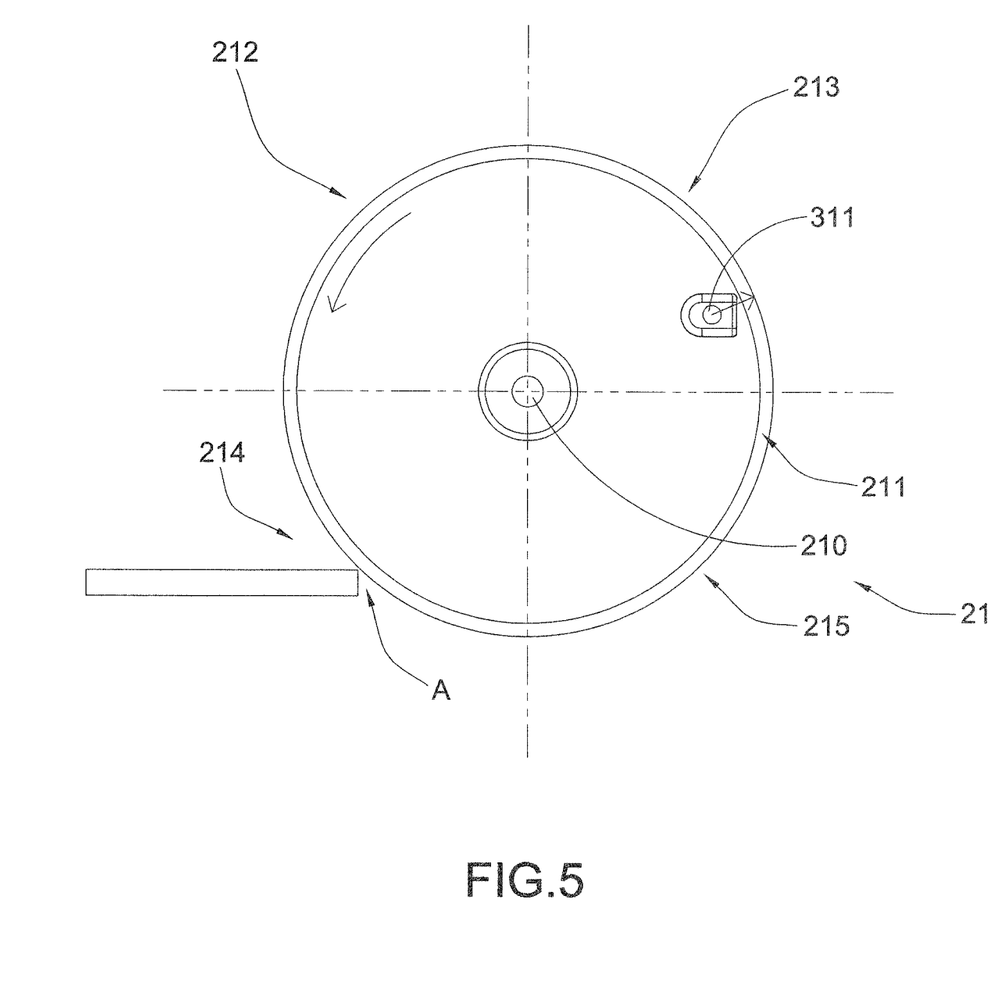
FIG. 5 illustrates an injecting angle of the fluid nozzle unit being set at a rearward direction of the cutting machine according to the above preferred embodiment of the present invention.

In particular, during the rotation, the cutting blade 21 further defines an upper front quadrant 212, an upper rear quadrant 213, a lower front quadrant 214, and a lower rear quadrant 215, as shown in FIG. 5. Therefore, the upper portion of the cutting blade 21 includes the upper front quadrant 212 and the upper rear quadrant 213 while the lower portion of the cutting blade 21 includes the lower front quadrant 214 and the lower rear quadrant 215. In particular, the cutting point A is defined at the lower front quadrant 214 of the cutting blade 21.

As shown in FIGS. 3 and 4, the cooling arrangement 30 comprises a fluid nozzle unit 31 supported at the cutting head arrangement 20 for delivering cooling fluid onto the cutting edge portion 211 of the cutting blade 21 to ensure the cooling fluid to adhere on the cutting blade 21 by means of a cohesion of the cooling fluid so as to cool the cutting blade 21 during the cutting operation and to combine the cooling fluid with residual particles of the work piece after the work piece is cut. Accordingly, the cooling fluid can be water, coolant, lubricant, and/or the combination thereof.

The fluid nozzle unit 31 is arranged to deliver the cooling fluid onto the upper portion of the cutting blade 21 at the cutting edge portion 211. Preferably, the fluid nozzle unit 31 is coupled at a rear portion of the blade casing 22 for delivering the cooling fluid onto the cutting blade 21 within the blade cavity 222. In particular, the fluid nozzle unit 31 is arranged for delivering the cooling fluid at the upper rear quadrant 213 of the cutting blade 21.

As shown in FIGS. 3 and 4, the cooling arrangement 30 comprises a fluid nozzle unit 31 supported at the cutting head arrangement 20 for delivering cooling fluid onto the cutting edge portion 211 of the cutting blade 21, as the arrows shown in the FIG. 4, to ensure the cooling fluid to adhere on the cutting blade 21 by means of a cohesion of the cooling fluid so as to cool the cutting blade 21 during the cutting operation and to combine the cooling fluid with residual particles of the work piece after the work piece is cut. Accordingly, the cooling fluid can be water, coolant, lubricant, and/or the combination thereof.

Due to the high rotational speed of the cutting blade 21, the cutting blade 21 will spin the excessive the cooling fluid out of the surface of the cutting blade 21, such that only the cooling fluid will adhere on the cutting blade 21 by means of adhesion and cohesion of the cooling fluid. For example, when water is used as the cooling fluid to spray onto the cutting blade 21, water molecules will attract with each other via intermolecular forces by means of water cohesion. In addition, the water molecules will also attract on the surface of the cutting blade 21 by means of adhesion. Therefore, the cooling fluid can effectively stayed on the blade surface of the cutting blade 21 to cool down the cutting blade 21. In addition, the cooling fluid further acts as a lubricant which does cool the cutting blade by allowing the cutting blade to encounter less friction as it cuts away the work piece. After the work piece is cut by the cutting blade 21, the residual particles of the work piece will combine with the cooling fluid for preventing dust from forming during cutting operation. Having less amount of cooling fluid within the blade casing 22, less mist will be created within the blade cavity 222 during the rotation of the cutting blade 21.

As shown in FIG. 5, an injection angle of the fluid nozzle unit 31 as the injection direction of cooling fluid from the fluid nozzle unit 31 to the cutting blade 21. Accordingly, the injecting angle of the fluid nozzle unit 31 is set at a rearward direction with respect to the cutting machine for preventing the cooling fluid stayed on the cutting blade 21 in an over-saturated manner. Preferably, the injecting angle is aligned with a radial direction of the cutting blade 21. It is worth mentioning that less amount of cooling fluid can be used for delivering onto the cutting blade 21 since the cooling fluid will stay on the cutting blade 21 by means of adhesion and cohesion.

As shown in FIGS. 3 and 4, the nozzles heads 311 are rotatably coupled at the casing walls 221 of the blade casing 22, such that the nozzles heads 311 of the fluid nozzle unit 31 are adjustable to adjust the injecting angle between the rearward direction and a forward direction with respect to the cutting machine. Accordingly, adjusting the nozzles heads 311 of the fluid nozzle unit 31 at the forward direction is for the user who is accustomed to having more cooling liquid on the cutting blade 21.

The cooling arrangement 30 further comprises a fluid reservoir 32 for containing the cooling fluid and a flexible delivery hose 33 extended from the fluid reservoir 32 to the fluid nozzle unit 31 for delivering the cooling fluid from the fluid reservoir 32 to the fluid nozzle unit 31. Preferably, two delivery hoses 33 are extended from the fluid reservoir 32 to the nozzle heads 311 respectively.

In order to collect the cooling fluid and the residual particles of the work piece during the cutting operation, the cutting head arrangement 20 further comprises a splash guard 23 located at a rear side of the cutting blade 21, such that when the fluid nozzle unit 31 delivers the cooling fluid onto the cutting edge portion 211 of the cutting blade 21, the cooling fluid with the residual particles of the work piece are diverted by the splash guard 23.

Preferably, the splash guard 23 is located behind a rear end of the blade casing 22 to align with the bottom opening thereof for diverting the cooling fluid with the residual particles of the work piece deflected from the cutting blade 21 and from the bottom opening of the blade casing 22. Accordingly, the cooling fluid with the residual particles of the work piece is diverted by the splash guard 23 out of the cutting table 42, so as to ensure the work piece being cut less wet and cleaner.

It is worth mentioning that since no excessive cooling fluid is stayed on the cutting blade 21, the cooling fluid will not be splashed sidewardly during the cutting operation of the cutting blade 21. When the cooling fluid combines with residual particles of the work piece after the work piece is cut, the cutting blade 21 will be cleaned to prevent any residual particles being stuck thereon.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An overhead cutting machine for cutting a work piece, comprising:

a supporting frame comprising a base frame and a cutting table slidably supported on said base frame for supporting the work piece thereon;

a cutting head arrangement which is overhung above said cutting table, wherein said cutting head arrangement comprises a blade shaft and a circular cutting blade driven to rotate via said blade shaft at a center of said cutting blade at a forward spinning direction, wherein said cutting blade has a circular cutting edge portion defined at an outer edge portion thereof for contacting with the work piece at a cutting point during a cutting operation, wherein said cutting head arrangement further comprises a blade casing which comprises two casing walls and a blade cavity formed between said casing walls to rotatably receive an upper portion of said cutting blade, such that said cutting blade is positioned between said casing walls of said blade casing, wherein said cutting blade defines an upper front quadrant, an upper rear quadrant, a lower front quadrant, and a lower rear quadrant during the cutting operation, wherein said cutting point is defined at said lower front quadrant of said cutting blade; and a cooling arrangement which comprises a fluid nozzle unit supported at said cutting head arrangement for delivering a cooling fluid at said upper rear quadrant of said cutting blade so as to ensure the cooling fluid being delivered onto said cutting edge portion of said cutting blade away from said cutting point during the cutting operation, wherein said fluid nozzle unit comprises two nozzle heads coupled at said casing walls of said blade casing respectively within said blade cavity adjacent to said cutting edge portion of said cutting blade located within said blade cavity in such a manner that the cooling fluid is delivered directly onto said upper front quadrant of said cutting edge portion of said cutting blade to prevent excessive cooling fluid of the cooling fluid is delivered within said blade cavity and build up moisture within said blade cavity so as to prevent a mist environment built up within said blade cavity during a rotation of said cutting blade within said blade cavity, wherein said cutting blade is positioned between said two nozzle heads and is operable to rotate between said two nozzle heads, wherein said nozzle heads are arranged to configure an injecting angle of each of said nozzle heads of said fluid nozzle unit at a rearward direction with respect to said cutting machine for preventing the cooling fluid stayed on said cutting blade in an over-saturated manner, wherein each of said nozzle heads is aligned with a radial direction of said cutting blade which radially extends through a center of said cutting blade to allow said nozzle heads to inject the cooling fluid into said blade casing at said injecting angle toward said cutting edge portion of said cutting blade at two opposite sides thereof, so as to cool said cutting edge portion of said cutting blade and act as a lubricant allowing said cutting blade to encounter less friction when said cutting blade is cutting the work piece, for ensuring the cooling fluid to adhere on said sides of said cutting blade and combining the cooling fluid with residual particles of the work piece after the work piece being cut by said cutting blade.

2. The overhead cutting machine, as recited in claim 1, wherein each of said nozzle heads of said fluid nozzle unit is rotatably coupled at a rear portion of said casing wall of said blade casing for delivering the cooling fluid onto said cutting edge portion of said cutting blade within said blade cavity.

3. The overhead cutting machine, as recited in claim 2, wherein said nozzle heads of said fluid nozzle unit are adjustable to adjust said injecting angle between said rearward direction and a forward direction with respect to said cutting machine.

4. The overhead cutting machine, as recited in claim 3, wherein each of said nozzle heads is a spraying head for delivering the cooling fluid onto said cutting blade to prevent a mist environment built up within said blade cavity to form mist during said cutting operation.

5. The overhead cutting machine, as recited in claim 4, wherein said cooling arrangement further comprises a fluid reservoir for containing the cooling fluid and a flexible delivery hose extended from said fluid reservoir to said fluid nozzle unit for delivering the cooling fluid from said fluid reservoir to said fluid nozzle unit.

6. The overhead cutting machine, as recited in claim 5, wherein said cutting head arrangement further comprises a splash guard located at a rear side of said cutting blade under said blade casing, such that when said fluid nozzle unit delivers the cooling fluid onto said cutting edge portion, the cooling fluid with the residual particles of the work piece are diverted by said splash guard out of said cutting table, wherein said splash guard is located behind a rear end of said blade casing and is aligned with a bottom opening of said blade casing for diverting the cooling fluid with the residual particles of the work piece deflected from said cutting blade and from said bottom opening of said blade casing.

7. The overhead cutting machine, as recited in claim 3, wherein said cooling arrangement further comprises a fluid reservoir for containing the cooling fluid and a flexible delivery hose extended from said fluid reservoir to said fluid nozzle unit for delivering the cooling fluid from said fluid reservoir to said fluid nozzle unit.

8. The overhead cutting machine, as recited in claim 3, wherein said cutting head arrangement further comprises a splash guard located at a rear side of said cutting blade under said blade casing, such that when said fluid nozzle unit delivers the cooling fluid onto said cutting edge portion, the cooling fluid with the residual particles of the work piece are diverted by said splash guard out of said cutting table, wherein said splash guard is located behind a rear end of said blade casing and is aligned with a bottom opening of said blade casing for diverting the cooling fluid with the residual particles of the work piece deflected from said cutting blade and from said bottom opening of said blade casing.

9. The overhead cutting machine, as recited in claim 1, wherein each of said nozzle heads is a spraying head for delivering the cooling fluid onto said cutting blade to prevent the mist environment built up within said blade cavity to form mist during said cutting operation.

10. The overhead cutting machine, as recited in claim 1, wherein said cooling arrangement further comprises a fluid reservoir for containing the cooling fluid and a flexible delivery hose extended from said fluid reservoir to said fluid nozzle unit for delivering the cooling fluid from said fluid reservoir to said fluid nozzle unit.

11. The overhead cutting machine, as recited in claim 1, wherein said cutting head arrangement further comprises a splash guard located at a rear side of said cutting blade under said blade casing, such that when said fluid nozzle unit delivers the cooling fluid onto said cutting edge portion, the cooling fluid with the residual particles of the work piece are diverted by said splash guard out of said cutting table, wherein said splash guard is located behind a rear end of said blade casing and is aligned with a bottom opening of said blade casing for diverting the cooling fluid with the residual particles of the work piece deflected from said cutting blade and from said bottom opening of said blade casing.

* * * * *